W. M. JEWELL.
ART OF FILTRATION.
APPLICATION FILED OCT. 23, 1915.

1,232,805.

Patented July 10, 1917.
5 SHEETS—SHEET 1.

Witnesses:
Inventor:
William M. Jewell,

W. M. JEWELL.
ART OF FILTRATION.
APPLICATION FILED OCT. 23, 1915.
1,232,805.
Patented July 10, 1917.
5 SHEETS—SHEET 2.
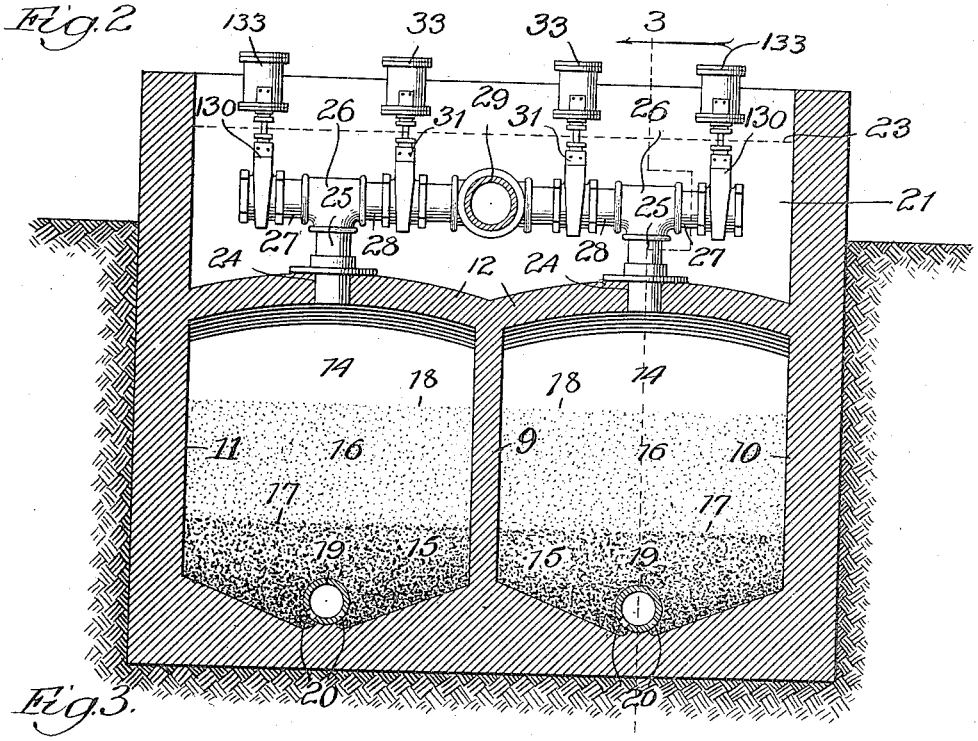
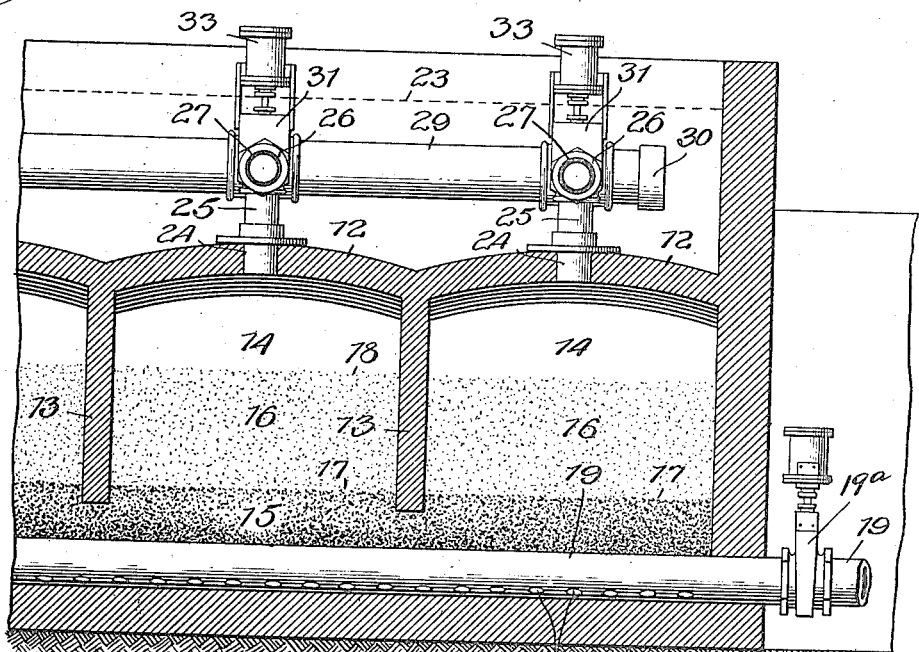

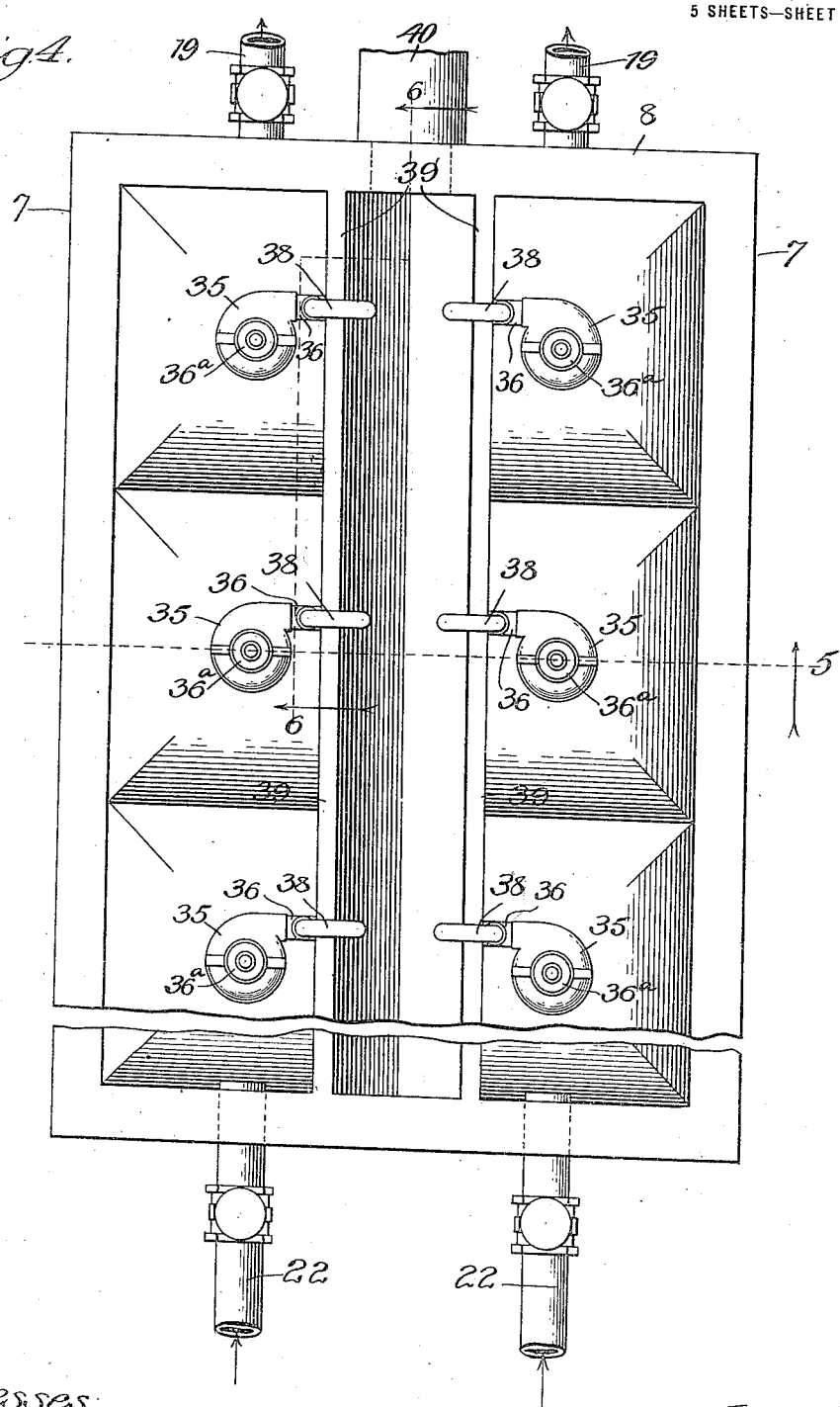

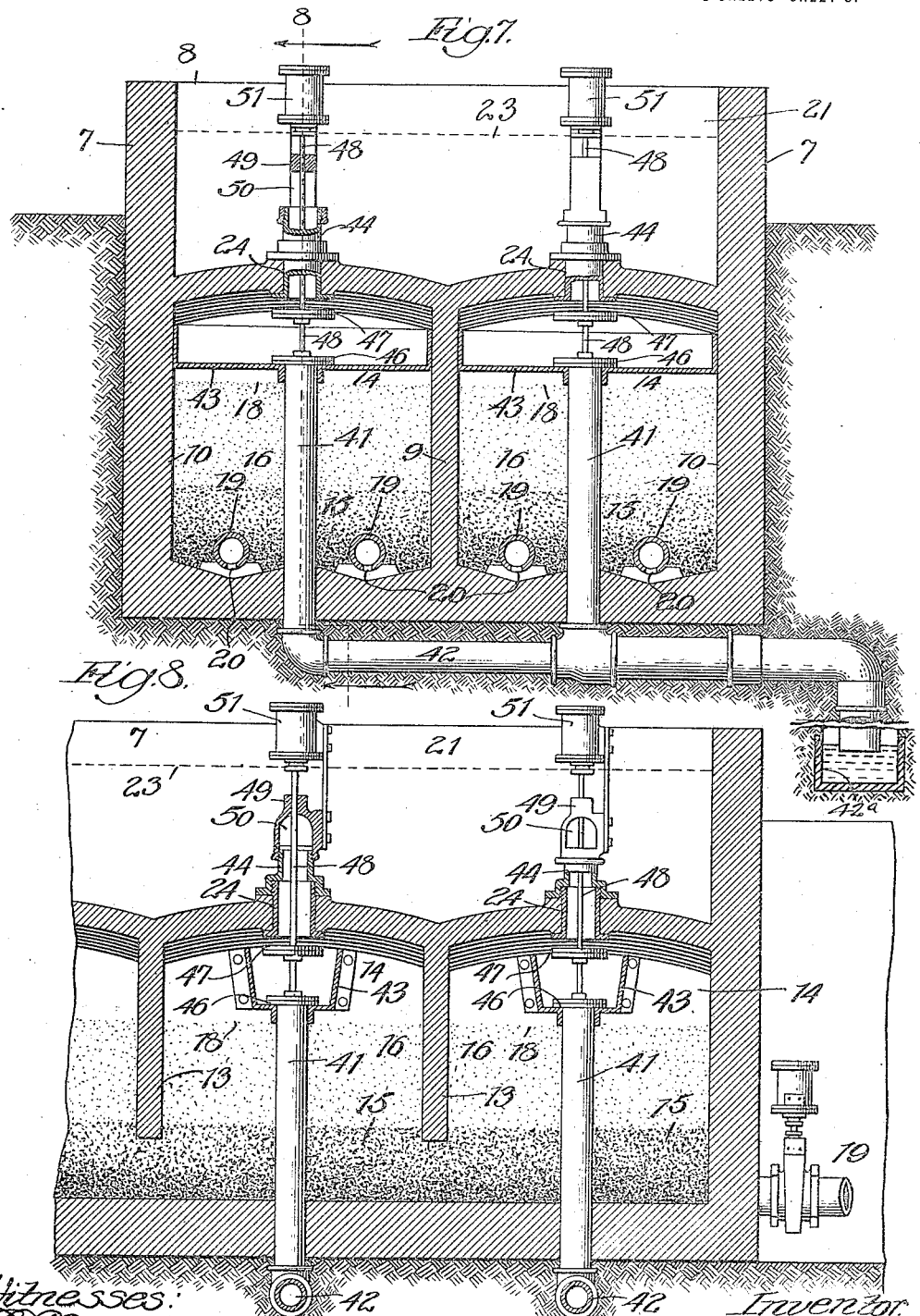

UNITED STATES PATENT OFFICE.

WILLIAM M. JEWELL, OF CHICAGO, ILLINOIS, ASSIGNOR TO JEWELL ENGINEERING COMPANY, OF CHICAGO, ILLINOIS, A CORPORATION OF ILLINOIS.

ART OF FILTRATION.

1,232,805.  Specification of Letters Patent.  Patented July 10, 1917.

Application filed October 23, 1915. Serial No. 57,437.

*To all whom it may concern:*

Be it known that I, WILLIAM M. JEWELL, a citizen of the United States, residing at Chicago, in the county of Cook and State of Illinois, have invented a new and useful Improvement in the Art of Filtration, of which the following is a specification.

My objects, generally stated, are to reduce the cost of filter installation, and provide for the effective washing of the filter without unduly interfering with the filtering operation.

Filters as hitherto provided involve the use of a relatively large number of pipes at the bottom of the filter, opening into the latter at intervals usually at collecting nozzles thereon, for conducting the filtered water out of the filter, and conducting into the filter at a relatively large number of points, water for washing the filter, and also involve the use of wash-water pumps and wash-water tanks, and specifically stated, one of my objects is to render unnecessary the employment of the elaborate system of piping, and the pumps and wash-water tanks, heretofore rendered necessary.

Referring to the accompanying drawings—

Figure 1:
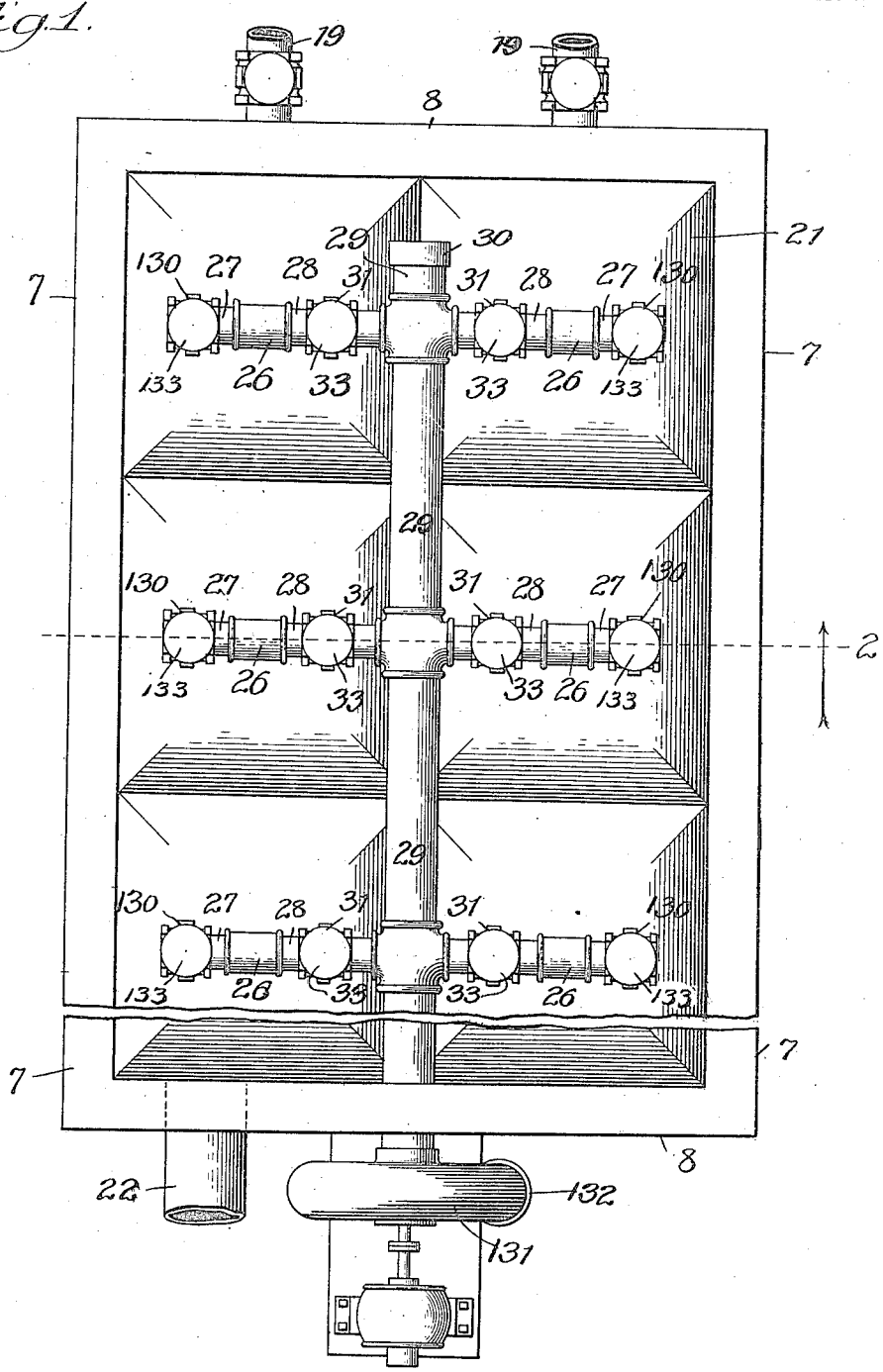
Figure 5:
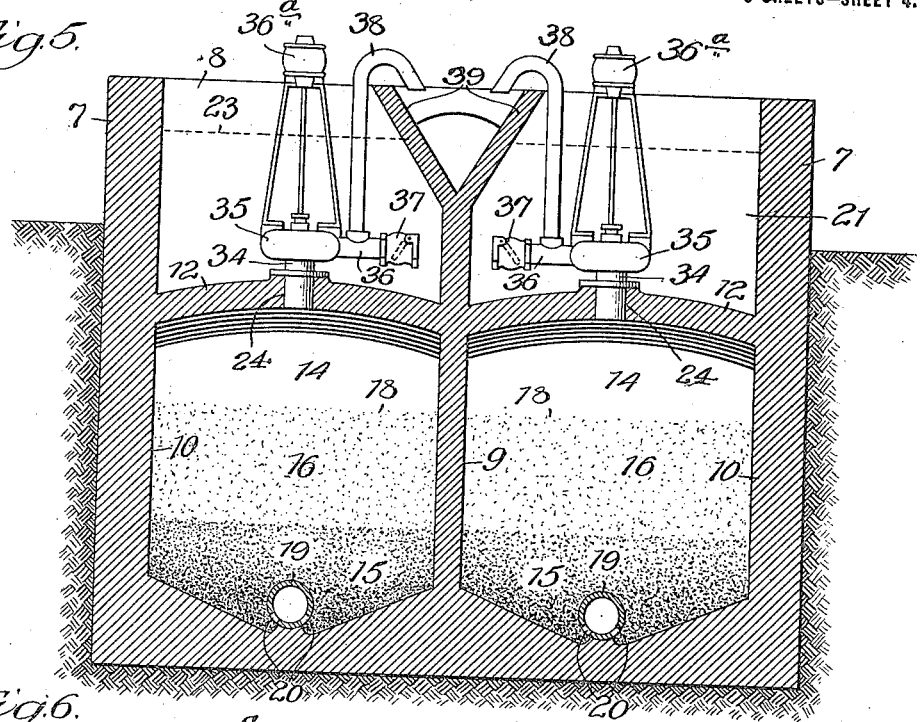
Figure 6:
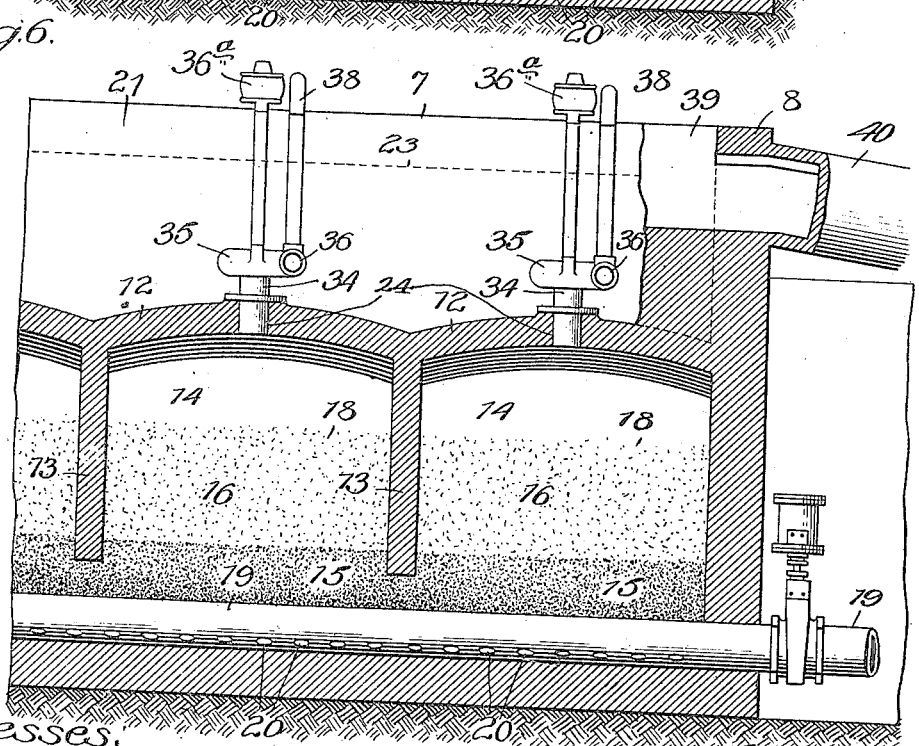

Figure 1 is a plan view of a filter installation of a desirable construction for practising my invention. Fig. 2 is a section taken at the line 2 on Fig. 1 and viewed in the direction of the arrow. Fig. 3 is a section taken at the irregular line 3 on Fig. 2 and viewed in the direction of the arrow. Fig. 4 is a view similar to Fig. 1 of a modified form of the apparatus of Fig. 1. Figs. 5 and 6 are sections taken at the lines 5 and 6, respectively, on Fig. 1 and viewed in the direction of the respective arrows. Fig. 7 is a view similar to Fig. 2 of another form of apparatus that may be used; and Fig. 8, a section taken at the line 8 on Fig. 7 and viewed in the direction of the arrow.

My improvement consists, generally stated, in its broader aspect, of effecting the flow of water through the filter for washing it, reversely of the direction of flow of water therethrough for filtering, by exerting suction action on the contents of the filter chamber, and more specifically to provide for the washing of the various cells or compartments of a plural cell filter, in succession, by means of suction action to avoid undue interference with the filtering operation.

Referring to the construction illustrated in Figs. 1, 2 and 3, the side and end walls of the filter are represented at 7 and 8, respectively, and dividing the space therebetween into two chambers 10 and 11, is a solid partition 9, which extends from the bottom of the filter upwardly to a point short of the upper ends of the walls 7 and 8. The upper ends of the chambers 10 and 11 are closed by a diaphragm 12, which arches upwardly in opposite directions from the partition 9, as shown in Fig. 2, and depending from the diaphragm 12 and extending transversely of the partition 9 at each side thereof are partitions 13 which, with the partition 9 and the walls of the filter, divides the chambers 10 and 11 into a plurality of compartments 14, of any desirable number, the partition 12 preferably also arching upwardly between the adjacent partitions 13 and between the latter and the end-walls of the filter, as represented in Fig. 3.

The filter-bed of any suitable material, such as for example, stratified gravel, represented at 15, with a superposed layer 16 of sand, the gravel extending to the line 17 and the sand to the line 18, rests upon the bottom of the filter, the partitions 13 extending downwardly into the filter mass preferably to a point slightly below the upper strata of the gravel 15. The walls of the filter and the vertical partitions 9 and 13 are so related, as shown, that each of the compartments 14 forms a filtering cell, these cells being out of communication with each other, excepting through the mass of filtering material below the lower edges of the partitions 13.

The bottom of the filter is provided with means for conducting therefrom the filtered water, these means in the construction illustrated comprising a pair of pipes 19 having rate-of-flow controlling valves 19ª and supported on the bottom of the filter at opposite sides of the partition 9 and midway between the latter and the opposite walls 7, these pipes, which contain perforations 20, leading to any suitable receptacle for receiving the filtered water, it being preferred that the bottom walls of the chambers 10 and 11 converge downwardly from the opposite walls thereof toward the center lines of these chambers, as represented in Fig. 2.

The upper portion of the filter, above the partition 9, forms a receptacle 21 into which the water to be filtered is introduced as through a pipe 22, which in practice would be equipped with any suitable means for maintaining the water in the receptacle 21 at a predetermined height, as for example, that indicated at 23.

The compartments 14 communicate at their top walls through openings 24 therein with the pipes 25 which open into T-couplings 26, one end of each coupling having a pipe 27 which opens into the receptacle 21 below the water level 23, and a pipe 28 which communicates with a header-pipe 29 closed at one end, as represented at 30, and in communication at its opposite end with the suction producing device 131 of any desirable construction, as for example, a centrifugal suction pump, the discharge end of which is represented at 132. Each of the pipes 27 and 28 contains a valve shown of the gate type, these valves being represented at 130 and 31, respectively, and separately operable to open and closed positions by any suitable mechanism, as for example, fluid-pressure-operated piston and cylinder mechanisms 133 and 33, respectively, located above the water level 23, the pistons of which are connected with the stems of these valves.

In the operation of the filter, the water to be filtered flows from the receptacle 21 through the pipes 27 and 25 (the valves 130 being open) into the several filter compartments 14, wherein the water filters through the filter-bed and flows out of the filter through the collecting pipes 19, from which it passes to the filtered-water-storage chamber (not shown).

The washing of the filter is preferably accomplished by washing one compartment 14 at a time, thereby avoiding the impairing of the filtering operation in the other compartments and rendering the filtering operation continuous. The washing of a compartment of the filter is accomplished by closing the one of the valves 130 which controls the flow of water to be filtered into the compartment of the filter to be washed, and opening the one of the valves 31 which controls communication between the header 29 and this compartment of the filter. The pump 131 being in operation, exerts suction on the interior of the filter compartment 14 thus in communication with the header 29, with the result of causing filtered water to flow through the filter-mass in said compartment in a direction reversely of the flow of water therethrough in filtering, thus washing the filter-mass, the wash-water and the accumulations thus washed from the filter-mass in this compartment flowing through the header 29 and discharging from the pump 131 through its outlet 132. Upon the conclusion of the operation of washing this compartment, the valve 31 is closed and the valve 130 for this compartment is opened, whereupon the filtering operation is resumed therein and the valves of another filter compartment are manipulated to shut off the flow thereto of water to be filtered and to open this compartment to the suction device 131. It will thus be understood that the operator may, at will, wash any one or more of the filter sections at a time, and in any desired order, or at any desired interval of time, and therefore the desired effective washing of the filter may be accomplished and the filter caused to operate with maximum efficiency.

The construction illustrated in Figs. 4, 5 and 6 is the same as that shown in the preceding figures, excepting as to the means for effecting the suction in the compartments 14 and the control of the flow of water to be filtered, into the filter. In the construction now being described, the openings 24 in the tops of the compartments 14 communicate with pipes 34 opening into casings 35 of rotary suction pumps of any desirable type, permitting water to flow therethrough from their outlet ends to their suction inlets when the pumps are idle, and driven from motors $36^a$ supported to extend above the water level 23 in the receptacle 21. The outlets of the pumps communicate with pipes 36 equipped at their outer ends, which open into the receptacle 21, with inwardly-swinging check-valves 37, and connected with these pipes intermediate their ends, are upwardly extending pipes 38 which have downwardly curved upper extremities terminating over a trough 39 extending lengthwise through the receptacle 21, with its upper edges above the water level 23 therein, this trough being connected at one end with a pipe 40, which discharges into any suitable drain.

In the filtering operation, the water to be filtered flows into the pipes 36 past the check-valves 37 therein, thence through the casings 35 of the suction pumps, in which operation they are at rest, and through the pipes 34 into the filter compartments 14, in which the water becomes filtered by passing through the filter-mass therein and discharges from the filter, as explained of the construction of the preceding figures. When it is desired that any one or more of the compartments 14 be washed, the suction pump or pumps, as the case may be, controlling this compartment or compartments, is started into operation with the result of causing filtered water to pass upwardly through the filter-mass in the particular compartment or compartments being subjected to the suction action, for washing the filter-mass, the water discharging through the pipe or pipes 38 into the trough 39 from which it flows into the pipe 40 to discharge, it being understood that as soon as the suction pump is placed in operation, the check-valve controlling communication between the pipe 36 and the receptacle 21 automatically closes in order that the course of the wash-water upon leaving the suction pump will be that described instead of discharging into the receptacle 21.

Referring particularly to the construction illustrated in Figs. 7 and 8, each of the compartments 14 has a pipe 41 extending upwardly therethrough preferably to a height slightly above the upper level of the layer 18 of the filter-mass, pairs of these pipes being connected at their lower ends with pipes 42 which lead to any suitable drain and have interposed therein, preferably at a point of say ten to thirty feet below the bottom of the filter, a water-trap, or seal, of any desirable construction. Such a water-seal is illustrated in the drawings wherein the pipe 42 is shown as extending at its open lower end into a drain 42ª below the water level maintained in the latter. The compartments 14 contain troughs 43 which extend above the level of the upper surface of the sand layer 18, and through the bottoms of which the pipes 41 open, respectively, at their upper ends, whereby the latter are caused to open into the respective troughs 43. The openings 24 in the upper walls of the compartments 14 contain cylindrical casings 44 which open at their upper ends into the receptacle 21 and at their lower ends into the upper portions of the respective compartments 14, to afford passageways for permitting the flow of water to be filtered from the receptacle 21 into the compartments 14.

Means are provided for controlling communication between the receptacle 21 and the compartments 14, and between the latter and the pipes 41. In the preferred, illustrated construction, these means are in the form of valves operated from a single source. The valves for the upper ends of the pipes 41 are represented at 46 and the valves for the members 44, and which coöperate with the lower open ends of the latter, are represented at 47. These valves are rigidly secured to vertically reciprocable rods 48, the latter extending upwardly through the respective cylindrical members 44 and having guidance in guides 49 provided in frame-like members 50 which surmount the respective members 44 and are equipped with piston and cylinder mechanisms 51 connected respectively with the rods 48, for reciprocating the latter, as will be well understood in the art, it being readily understood from the foregoing that when the valves 46 close the upper ends of the pipes 41, the valves 47 will be open, and when the valves 47 close the lower ends of the cylindrical members 44 the valves 46 will be open.

As the pipes 41 by preference extend upwardly through the center of the compartments 14, it is preferred that the water-collecting pipes 20 be provided in pairs, as shown in Fig. 7.

The operation of the filter is as follows: Assuming the valves 46 and 47 to be positioned as illustrated in Fig. 7, the water to be filtered flows from the receptacle 21 through the cylinder members 44 and into the open ends of the compartments 14, maintaining the latter filled at all times during the filtering operation, the water filtering through the filter-mass and being conveyed therefrom as hereinbefore described in connection with the structures hereinbefore previously described. When it is desired that the filter-mass associated with a compartment 14 be washed the operator will operate the one of the piston and cylinder mechanisms 51 coöperating therewith, to lift the valves 46 and 47 to open and close these valves, respectively. This will arrest the flow of unfiltered water from the receptacle 21 into the particular compartment 14 referred to and will cause the water in the upper part of this compartment and in the trough 43 therein, to flow into the pipe 41 in communication therewith, thereby producing suction in the upper part of this compartment 14 and causing the filtered-water to flow through the filter-mass associated with this compartment reversely to the flow therethrough of filtered water, by the siphoning action thus set up, it being understood that the pipes 42 should discharge at their lower ends at a point a distance below the bottom of the filter sufficient to effect the desired siphoning action, and secure the desired rate of flow of the upward current of wash-water through the filter-mass for properly washing the latter. Another advantage due to the washing of the filter by suction applied to the filter from above the filter-mass is that of augmenting the release of air or gases contained in the water in its passage through the filter-mass for washing reversely to the flow of water therethrough in the filtering operation, which supplements the action of the wash-water in agitating the upper layer of the filter-mass and thus produces a more rapid and thorough cleansing of the filter.

While I have illustrated and described particular forms of apparatus which are suitable for carrying out my invention, I do not wish to be understood as intending to limit it thereto, as it may be practised by other forms of apparatus.

What I claim as new and desire to secure by Letters Patent is—

1. In the art of filtration by gravity, the method of washing a filter which consists in producing a flow of water through the filter-mass reversely of the flow therethrough in the filtering operation solely, by suction applied to the filter above the filter-mass.

2. In the art of filtration by gravity, the method of washing a filter which consists in producing a flow of water previously filtered in the filter, through the filter-mass reversely of the flow therethrough in the filtering operation solely, by suction applied to the filter above the filter-mass.

3. In the art of filtration by gravity, the method of washing a filter which consists in shutting off the flow of influent water to the filter, and in producing a flow of water through the filter-mass reversely of the flow therethrough in the filtering operation, solely by suction applied to the filter above the filter-mass.

4. In the art of filtration by gravity, the method of washing a filter, which consists in shutting off the flow of influent water to the filter, and in producing a flow of water previously filtered in the filter, through the filter-mass, reversely of the flow therethrough in the filtering operation, solely by suction applied to the filter above the filter-mass.

WILLIAM M. JEWELL.

In presence of—
 LOUISE HEISLAR,
 D. C. THORSEN.